3,448,699
OVEN FOR BAKING
William H. Friend, 40 Forest St., Forest Hill, Johannesburg, Transvaal, Republic of South Africa
Filed May 23, 1967, Ser. No. 640,636
Claims priority, application Republic of South Africa, May 26, 1966, 66/3,046
Int. Cl. A21b *1/00;* B65g *13/00;* B66f *9/06*
U.S. Cl. 107—55                                   3 Claims

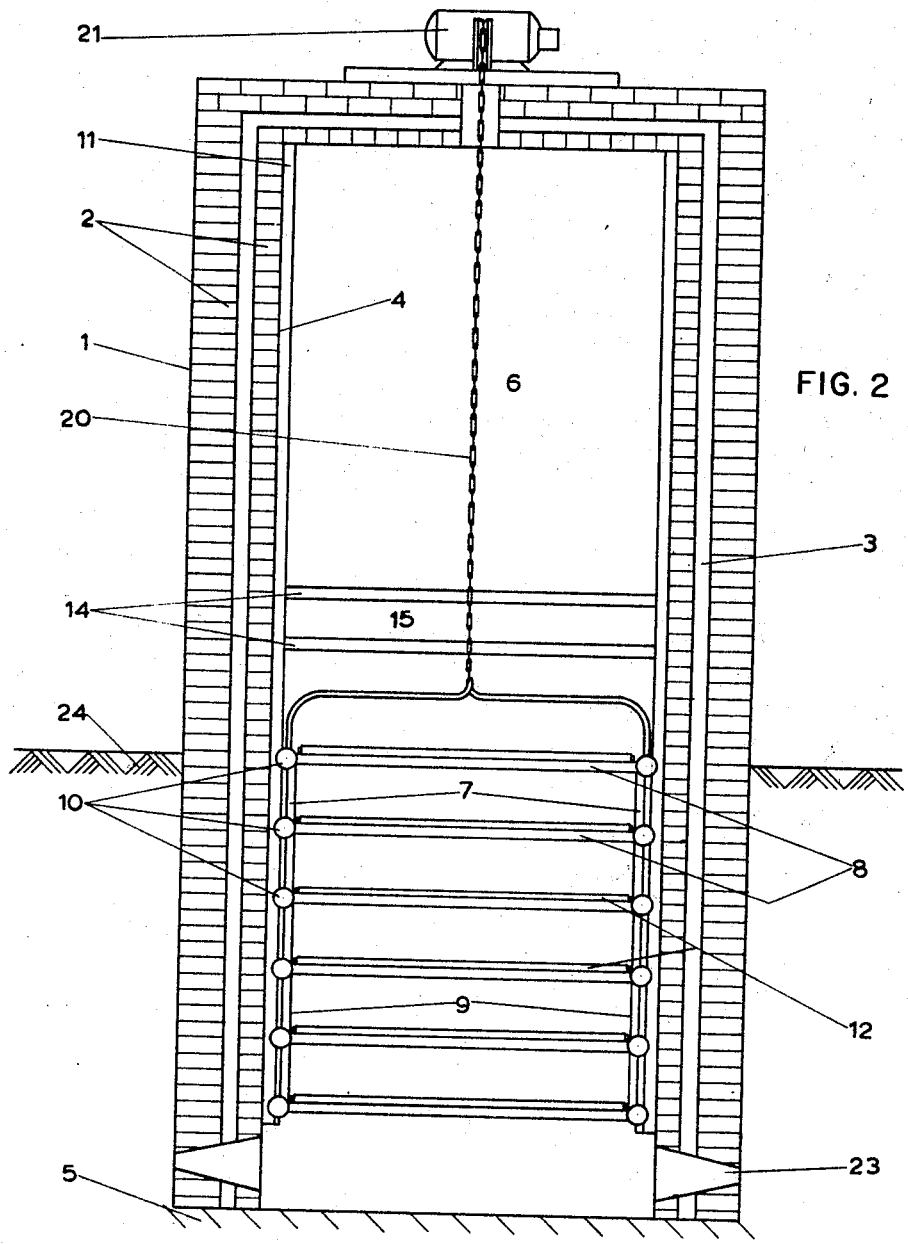

ABSTRACT OF THE DISCLOSURE

Commercial baker's oven wherein the baking chamber extends vertically and includes a series of baking floors arranged in a conveyance which may be raised and lowered past a door into the oven.

---

This invention relates to ovens for the baking of bread, confections and the like, particularly peel ovens.

Peel ovens are well known. They are built of brick and often have two superimposed floors or sole plates. They may be placed back to back so that they can be serviced from both sides. Even with these arrangements the ovens require a lot of floor space in relation to the actual output of bread from the bakery.

It is the object of this invention to provide an oven with a reduced floor area but capable of giving a large output.

In accordance with this invention there is provided a baker's oven which includes an outer oven structure, a vertically movable conveyance within the structure and means for raising and lowering the conveyance both above and below an oven door provided in a wall of the structure, said conveyance having a number of superimposed baking floors thereon.

Further features of the invention provide for the baking floors each to comprise a generally horizontal bed of rollers, for the floors to be mounted to tip downwardly and upwardly away from the oven door, and for such tipping movement to be effected by means of jointed members connecting the floors to the framework of the conveyance.

As an example a preferred form of the invention is described below with reference to the accompanying diagrammatic drawings in which:

FIG. 2 is a view from the back of the oven with the back wall cut away, and

FIG. 3 is a side view of a single baking floor.

Figure 1:
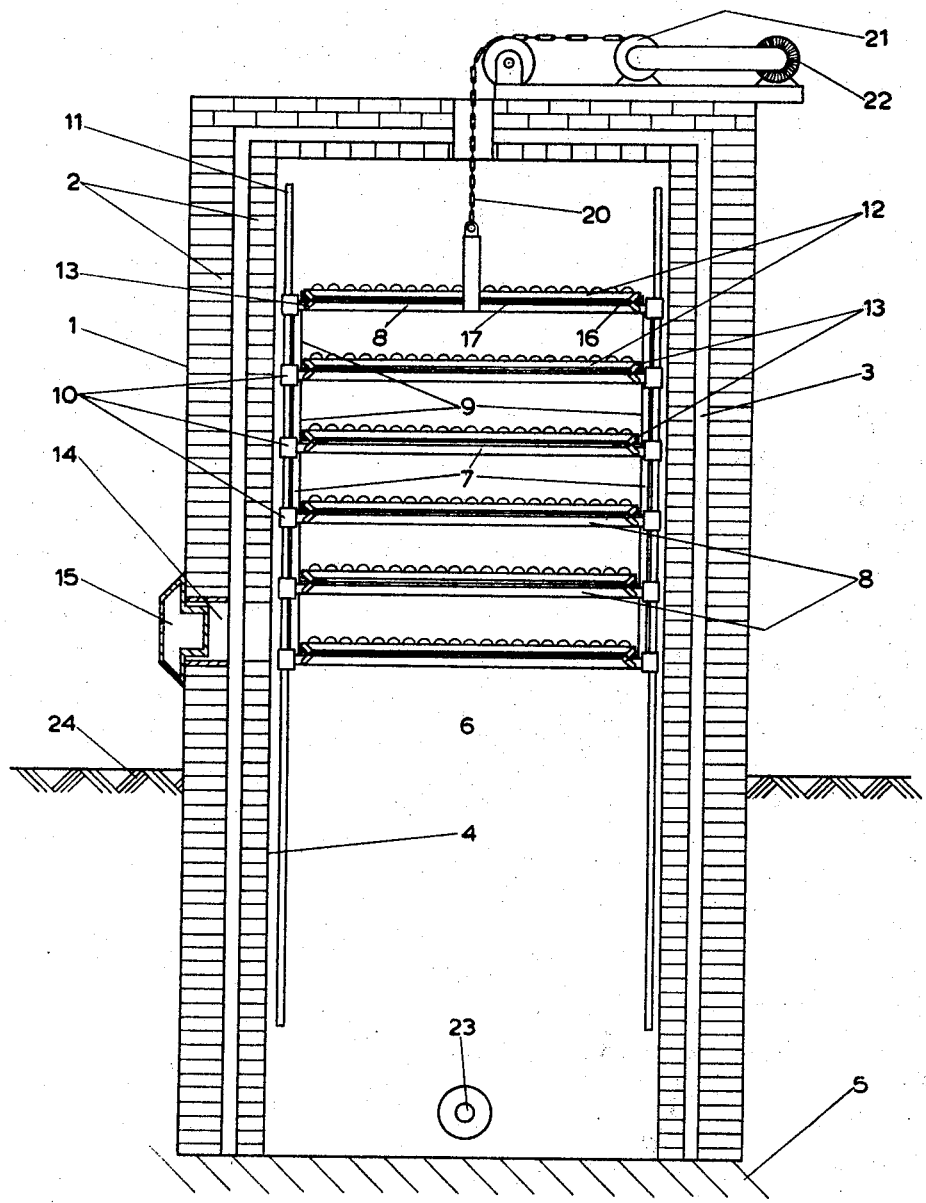
FIG. 1 is a side-view of the oven with the side wall cut away.

In this preferred form the baking oven 1 comprises a brick oven having double walls 2 with preferably a heat insulating lining 3 between the walls 2. The internal surface 4 of the oven should be made of some reflective material which not only will withstand heat but will reflect it internally. The foundation 5 for the oven is usually below floor level, as hereafter described. The oven is such that it provides a rectangular space 6 inside the oven which houses a vertically movable conveyance 7. The conveyance 7 comprises a number of superimposed rectangular frame members 8 which are connected by means of struts 9. Also connected to the frames 8 are wheels 10 which run on vertical guide rails 11 secured to the sides of the oven. The function of the wheels and rails is to stabilize and guide the conveyance when the latter is moving.

Each frame member 8 supports a generally horizontal bed 12 of rollers. Each bed 12 of rollers is mounted above its respective frame member 8 the mounting being through elbow joints 13 positioned at each corner of the bed, the axis of the rollers all being parallel to the width of the opening 14 for the oven door 15.

A bed 12 of rollers rests normally on metal blocks 16 and a rod 17 passes through the pivots 18 of corresponding front and rear elbow joints. The rod 17 has lugs 19 secured thereto as shown in FIG. 3. With the arrangement as shown in FIG. 3 it will be appreciated that if the rod 17 is pulled towards the oven door the front portion of the bed will lift and if the rod is pushed away from the oven door the rear of the bed will lift as a result of the lugs 19 engaging the respective pivot 18.

The conveyance 7 is suspended within the oven from one end of a chain 20 which extends out of the top of the oven and to a drum 21 which is driven by a motor 22.

The oven is heated from oil burners indicated by numeral 23, situated at the bottom of the oven, and the oven door 15 is situated about half the distance up the oven. Thus, if the oven is a reasonably large one a floor 24 will be required above the base of the oven in order to facilitate loading and unloading of the oven.

In use the oven may be used starting with the conveyance 7 in its lowermost position with the top baking floor opposite the oven door 15. For loading the bed 12 the rollers of the baking floor is tilted backwards so that the baking tins run towards the back of the oven under the influence of gravity. When the top floor is fully loaded the conveyance is raised so that the second topmost baking floor is opposite the oven door. Thus the loading is effected in stages until all the baking floors are loaded. In this position the conveyance will be above the oven door. The conveyance is then lowered until the top floor is again opposite the oven door and the bread in the topmost floor is baked for the required time. Thereafter the oven door is opened and the top of the baking floor is then unloaded by tilting the bed of rollers downwardly towards the oven door thus causing the baking tins thereon to roll out under the influence of gravity. The baking floor may then be reloaded. The second baking floor is then brought to line with the oven door and treated in a similar fashion. Thus unloading and possibly reloading is effected in stages until the lowermost baking floor has been unloaded and reloaded.

It will be appreciated that many variations may be made to the above example without departing from the scope of the invention. For example, the mechanism for tilting the beds of rollers is not limited to that described and may be any other type such as wedge operated, cam operated, eccentric rollers all of which may be manually or electrically operated.

Also, the baking floors do not have to comprise a bed of rollers and the supporting surface need not be tiltable in which case other means should be provided for loading and unloading the conveyance.

In practice, it is anticipated that two ovens built side to side or back to back would be a saving in expense and space. In this arrangement a single chain drive motor could be used.

In all cases, however, the loading time and baking time should be considered since in a body designed oven of this type the bread on the top baking floor when the oven is used as described may be cooked before loading of the lower floors is completed.

It will therefore be seen that owing to the fact that ovens built in accordance with this invention extend vertically upwards, there is a substantial saving in space when compared with the generally used peel ovens.

What I claim as new and desire to secure by Letters Patent is:

1. A baker's oven comprising an outer oven wall structure, a door through the wall, fixed vertical guide rails on the inside of said wall structure extending substantially equal distances above and below the horizontal plane of the oven door, a vertically movable conveyance guided by said rails within the structure, a number of superimposed horizontal movable baking floors in the conveyance and means for raising and lowering the latter past the oven door, and each baking floor comprising a bed of laterally adjacent rollers with each floor being tiltable independently of the others.

2. A baker's oven comprising an outer oven wall structure, a door through the wall, a vertically movable conveyance within the structure, a number of superimposed baking floors in the conveyance and means for raising and lowering the latter past the oven door, said baking floors including means for independently tipping said floors downwardly towards and away from the oven door.

3. A baker's oven as claimed in claim 2 in which the tipping means include jointed members connecting the doors to the conveyance.

References Cited

UNITED STATES PATENTS

| 116,762 | 7/1871 | Shaver | 107—55 |
| 31,192 | 1/1861 | Sellers | 107—56 XR |
| 2,168,391 | 8/1939 | Bemis | 107—57 |
| 2,790,567 | 4/1957 | Rockhill | 214—95 |
| 3,018,742 | 1/1962 | Ward | 107—55 |

FOREIGN PATENTS

| 161,384 | 4/1921 | Great Britain. |
| 895,920 | 5/1962 | Great Britain. |

WALTER A. SCHEEL, *Primary Examiner.*

ARTHUR O. HENDERSON, *Assistant Examiner.*

U.S. Cl. X.R.

193—35; 214—95